Jan. 20, 1959     J. H. THORBURN     2,869,273
SPEAR GUN
Filed Sept. 9, 1955
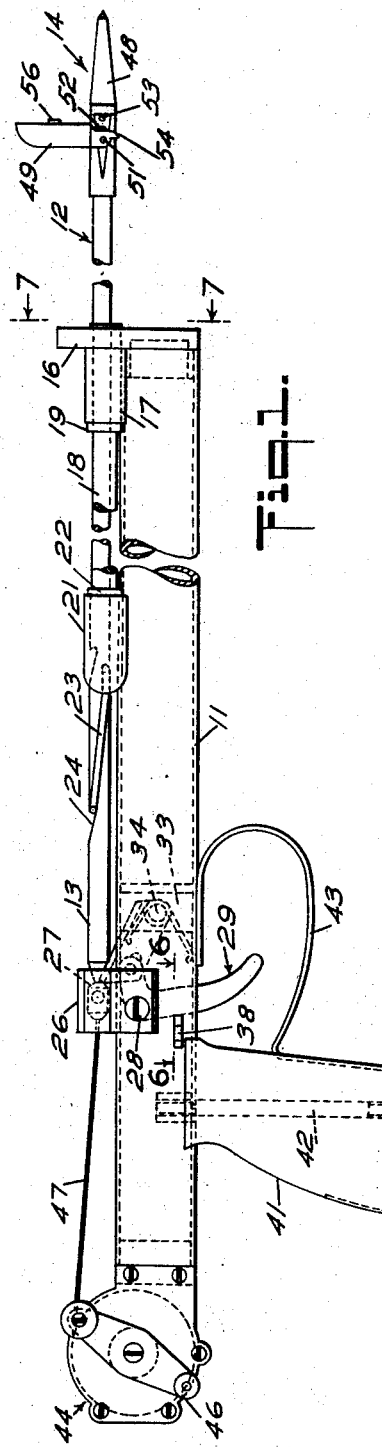
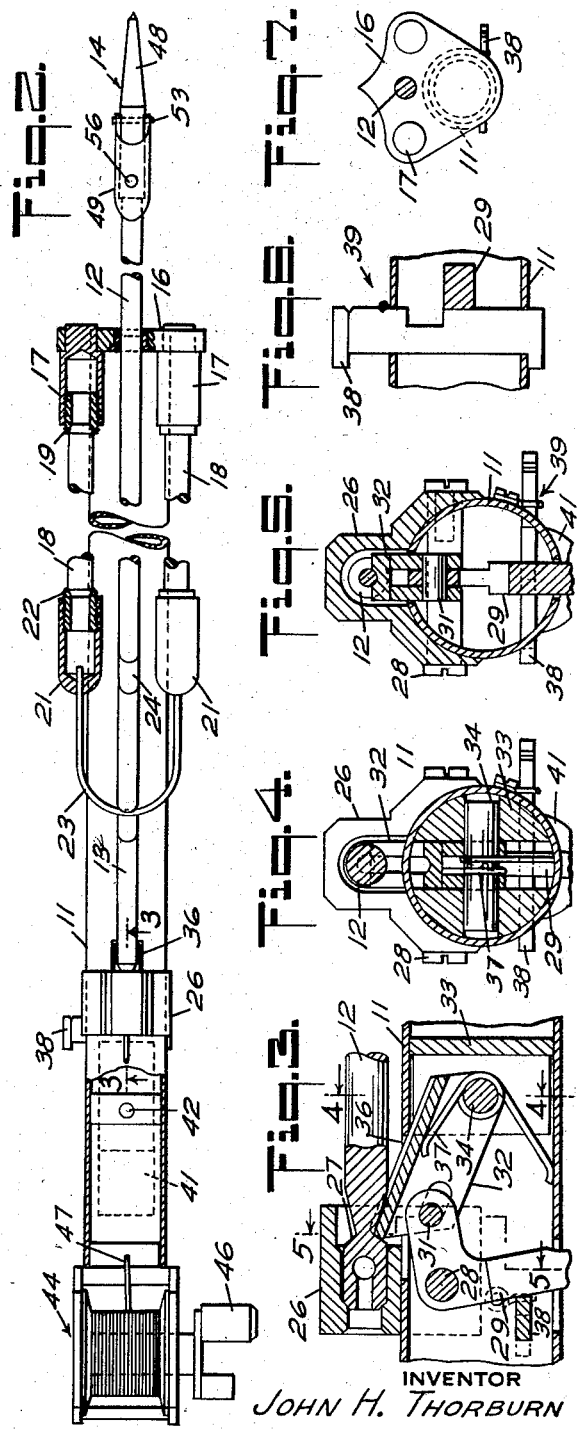
INVENTOR
JOHN H. THORBURN
BY
*Gardner & Zimmerman*
ATTORNEYS United States Patent Office 2,869,273
Patented Jan. 20, 1959

2,869,273

SPEAR GUN

John H. Thorburn, Napa, Calif.

Application September 9, 1955, Serial No. 533,267

2 Claims. (Cl. 43—6)

The present invention relates to an improved spear gun including a spear attached thereto.

Underwater fishing is normally carried on with a spear operated by the fisherman swimming underwater. With the advent and popularity of lightweight underwater breathing apparatus this sport has spread and there has arisen a need for means to propel the spear in order that the swimmer need not approach the target so closely and thereby materially increasing the ease with which fish may be taken by spear.

The spear gun of the present invention is ideally suited for underwater fishing as it is buoyant so that it may be easily carried by a swimmer. The gun is very accurate and powerful, the spear being propelled with such force that it transpierces all but very large fish at reasonable ranges. Additionally, the spear is attached to the gun proper by a line which reels out with the spear and may be reeled in to retrieve the spear and attached fish.

It is an object of the present invention to provide a spear gun having buoyancy.

It is another object of the present invention to provide a spear gun with a reel having a line wound thereabout attached to the spear therefor and passing through spear guide means.

It is a further object of the invention to provide a spear gun having an improved trigger mechanism.

It is yet another object of the present invention to provide a spear gun with an attached spear having a pivotal barb thereon normally locked in a retracted position and independently movable therefrom for limiting reverse spear motion through a target.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein:

Figure 1 is a shortened longitudinal side view of the spear gun.

Figure 2 is a plan view of the spear gun with portions broken away as indicated.

Figure 3 is a sectional view taken at 3—3 of Figure 2 showing the trigger mechanism and spear socket.

Figure 4 is a sectional view taken at 4—4 of Figure 3 and showing details of the trigger mechanism.

Figure 5 is a sectional view taken at 5—5 of Figure 3 and showing additional details of the trigger mechanism.

Figure 6 is a partial sectional view taken at 6—6 of Figure 1 and showing the safety lock.

Figure 7 is a transverse sectional view taken at 7—7 of Figure 1 and showing the head plate.

Considering now the structural details of the invention and referring to the drawing, there will be seen to be provided as the main structural member of the spear gun an elongated cylindrical tube 11 formed, for example, of thin walled dural and having a considerable length, as for example, three feet. The gun is adapted to eject or fire a sphere 12 having an elongated cylindrical shank 13 and a spear point 14 secured to the outermost end thereof. The spear 12 is adapted to reside atop the tube 11 in axial alignment therewith and to extend through an aperture in a head plate 16 affixed to the head end of the tube 11. The head plate 16 has a plug extending from one side thereof adjacent the plate bottom which mates with tube end for closing same and the head plate and tube are thereby joined and one end of the tube sealed airtight.

Propulsion of the spear 12 is accomplished in part from the head end of the spear gun and to this end a pair of cylindrical head connectors 17 are joined to the head plate above the tube and spaced equally from the spear aperture in the plate and on opposite sides thereof as by threaded or pressed engagement with the head plate at apertures therein. A pair of elongated resilient members 18 extend one from the rear of each head connector parallel to the tube axis and connection thereof to the head connectors is made by clamps 19 threaded into the head connectors. The resilient members 18, which may be formed of elastic rubber, are adapted to propel the spear by the resilient restoring force thereof following elastic deformation and there is secured to the rear end of each resilient member a cap 21 having a cylindrical configuration with one open and one closed end. A clamp 22 threaded into the open end of each cap 21 secures the resilient member therein. A U-shaped wire 23 has the free ends thereof extending into the caps 21 through a small hole in the closed end of each and secured thereby as by turned wire ends. The wire 23 is formed of a small diameter spring wire and extends rearward of the gun from the caps and between same. Connection is made between the resilient propelling members 18 and the spear by engagement of the wire 23 with one of a number of notches 24 formed transversely in the spear shank atop same. Different propelling forces may be applied to the spear by engaging the wire 23 in different notches on the spear.

Propulsion of the spear is produced by drawing same back into the gun with the wire 23 attached thereto so as to stretch the resilient members 18 and the spear is retained and released from such position by trigger mechanism shown generally in Figure 1 and more particularly in Figures 3, 4 and 5. Referring to these detailed figures it will be seen that the trigger mechanism includes a spear socket 26 formed as a body disposed atop the tube 11 with a curved undersurface mating with the tube and having a bore therethrough axially of the tube into which the butt of the spear shank is adapted to fit. Adjacent the butt end of the spear shank 13 there is formed a peripheral notch 27 having a sharply inclined rear surface and a tapering forward surface, as best seen in Figure 3. A shoulder about the bore in the socket 26 prevents the butt of the spear from passing entirely therethrough. The socket 26 is maintained in position by an anchor bolt 28 extending through the tube and the lower socket extremities with a short journal formed adjacent the center thereof upon which is disposed a trigger 29. The trigger 29 is formed as a long arm extending through a slot in the bottom of the tube with an aperture through the top thereof accommodating the anchor bolt journal so as to pivot thereabout, and a short arm extending at right angles to the long arm generally forward of the tube from the top of the trigger. The outer end of the short trigger arm is apertured to accommodate a transverse release pin 31 which rides in longitudinal slots formed in opposite sides of a deep channel serving as a spear release 32. An anchor block 33 is secured within the tube ahead of the socket 26 in closing relation to the tube and has a central slot vertically of the tube partially therethrough within which is fixed a short shaft 34 upon which is mounted the front end of the spear release 32. The shaft 34 extends through both vertical sides of the spear release channel 32 and the channel fits the slot in the anchor block so that no transverse motion of the spear release is possible and it is pivotable about the shaft 34. A longitudinal slot 36 is formed in the upper tube wall underlying a portion of the spear socket 26 and extending ahead of same, through which the rear portion of the spear release extends. A groove is formed longitudinally of the upper portion of the channel forming the spear release 32 on the upper surface thereof so that the release is adapted to fit into the notch 27 about the butt of the spear embracing a portion of the spear and bearing upon the rear surface of the notch to maintain the butt in the socket. The spear release is maintained normally pivoted upward for engagement with the spear shank by means of a spring 37 wound about the anchor block shaft between the sides of the release channel and having one end extending downward into engagement with the tube bottom and the other end extending upward against the under surface of the upper central channel portion. The spear release is thus pivotable at the forward end thereof about the anchor block shaft 34 and is maintained normally pivoted upward at the rear end thereof by the spring 37 to engage the spear shank 13 at the rear notch 27 thereof. Downward motion of the spear release to disengage same from the spear shank is accomplished by retraction of the long depending trigger arm beneath the tube as this causes the short trigger arm to pivot downward whereby the release pin 31 carried thereby rides down the spear release slots to pivot the spear release downward. Thus a pull upon the trigger 29 in the conventional manner of discharging firearms causes the spear release to pivot downward and release the spear for propulsion by the resilient members 18. The spring 37 normally holds the spear release in the catch position thereof so that it engages a spear shank inserted in the socket 26.

A safety lock is provided to prevent accidental discharge of the spear gun and same includes a notched bar 38 extending transversely through the tube through apertures in the side walls thereof below the socket and behind the depending trigger arm. The safety bar is longer than the tube diameter to slide transversely of the tube and has enlarged ends to limit motion thereof. The bar 38 is positioned to engage the back side of the depending trigger arm when same is pivoted forward so as to prevent retraction or pivoting of the trigger, with the bar slid all the way into the tube. The bar notch is formed in the front surface thereof toward the far end of the bar, as shown in Figure 6, so that sliding the bar back to the right of one holding the gun places the notch directly behind the trigger allowing actuation of the trigger. The safety thus has two operable positions, those of lock and release, and these positions are stabilized by a detent 39 including a spring attached to the tube side with spring bearing on the front surface of the safety bar 38 in which there are formed two notches. These notches are positioned so that with the spring therein the safety bar is in one of the above described positions or the other, all as shown in Figure 6.

A pistol grip handle 41 is provided depending from the tube 11 behind the trigger and same may be maintained in position by a draw bolt 42 threaded into a nut secured to the handle interiorly thereof and extending through the tube bottom into threaded engagement with a nut therein having, for example, a curved under surface mating with the interior tube wall. A trigger guard 43 is looped about the depending trigger extending from the tube under surface to the handle and interiorly thereto for spring attachment to the gun, as shown in Figure 1.

There is additionally provided as a portion of the spear gun means for attaching the spear 12 to the gun body whereby the spear may be readily retrieved following firing thereof and fish or the like impaled upon the spear may be at the same time recovered. Such means includes a reel 44 affixed to the rear end of the tube body 11 as by an extension fitting therein and bolted thereto. The reel 44 includes a rotatable central portion which is at all times free running and a handle 46 carried by the reel and engageable with the rotatable portion to wind same whereby a line 47 wound thereabout may be reeled in. The line 47 extends from the top of the reel through the opening in the socket 26 into attachment with the butt of the spear so that the spear is at all times connected to the gun body and forms a part of the spear gun.

As regards the spear 12, same has already been noted to include an elongated shank having a peripheral notch about the butt thereof, a plurality of transverse notches 24 for engagement with the resilient propulsion means, and a point 14. This latter portion of the spear includes a cylindrical head 48 having the front end thereof conically tapered to a point. There is attached to the point head 48 a barb 49 which has a semicircular cross section to fit upon the cylindrical head longitudinally thereof. The rear end of the barb is somewhat pointed in that same is curved in plan view, Figure 2, with the rearmost extremity at the top thereof. The front of the barb has an extension at the lower sides thereof formed by cutting a curved portion from the top front of the barb. Attachment of the barb to the head 48 is made by a pin 51 attached to opposite sides of the barb near the lower front portion thereof and extending through a transverse slot 52 in the head. The slot 52 has a nominal length longitudinally of the spear and head thereof so that the barb is limitedly slidable along the head and pivotable from a position axially of the spear to one substantially normal thereto as limited by the extent of the cut out portion at the top front of the barb. There is additionally provided a second pin 53 transversely through the spear head ahead of the slot therein and fixed in position to engage the under surface of a forward projection 54 on each side of the barb and beneath same when the barb is horizontal and slid forward in the slot 52. With the barb in position along the spear head, axially thereof, and slid forward in the head slot 52 the barb projections 54 ride over the head pin 53 so as to prevent rotation of the barb. In the rearward position of the barb, slid back in the head slot 52, the barb projections 54 do not reach the head pin 53 so that the barb is thus free to pivot upward at the rear thereof about the pin 51. A small rubber bumper or spacer 56 extending below the barb center, as by pressing through an aperture in the barb 49, prevents the latter from lying entirely flat against the spear head unless actually forced flat by manual pressure.

Operation of the above described spear gun is readily understood from the above description for in use it is only necessary to reel the spear 12 through the head plate 16 into the socket 26 by turning the reel handle 41 to wind up the line 47 attached to the spear. The spear release member 32 engages the spear butt at the peripheral notch therein to maintain the spear in the socket and the resilient members 18 are then stretched and attached to the spear by the wire 23 engaging a notch 24 in the spear shank 13. The gun is pointed at a target such as a fish and with the safety 38 in the release position the trigger is depressed whereby the spear release pivots downward out of the notch in the spear, releasing the spear so that the restoring force of the resilient members propels the spear from the gun with great force. The spear travels from the gun yet remains attached thereto by the line 47 and because of the great propelling force the spear penetrates and passes at least in part through the fish struck thereby. At the time of firing of the spear the barb 49 was depressed and locked in position by being pressed forward in part underneath the head pin 53. As the spear point 14 penetrates the fish the barb is forced backward free of the head pin 53 so as to be capable of pivoting upward. Any attempt to remove the spear as by actions of the speared fish causes the slightly raised back end of the barb 49 to strike the side of the fish so as to pivot the barb upward, whereby the spear cannot slip back through the fish. For the operator to free the spear from the fish it is only necessary to pivot the barb downward at the back and slip the barb forward beneath the head pin thus depressing the bumper 56 and locking the barb tightly against the point head.

What is claimed is:

1. A spear gun for propelling a spear, comprising an elongated body having a spear guide extending transversely from one end thereof and resilient means affixed thereto adapted to engage a spear disposed parallel to said body for propelling same through said guide, a spear socket secured to said body adjacent the end opposite said guide, said socket having an opening therethrough axially of said gun body with a shoulder thereabout adapted to receive a spear butt in limited engagement, a trigger pivotally mounted within said body and having an arm extending therefrom, a deep inverted channel shaped release member pivotally mounted at one end thereof and slidably engaging said trigger arm at the other end thereof for pivoting into and out of registry with said socket and adapted to engage a spear butt at a peripheral groove therein, and a spring maintaining said release member normally in registry with said socket for retaining a spear therein.

2. A spear gun as claimed in claim 1 further defined by said release member being disposed generally longitudinally of said gun body within same and having a longitudinal groove on the upper surface thereof adapted for maximum engagement with the butt of a spear in said socket, and a free running reel having rewinding means and a line wound thereabout extending through said socket opening adapted for connection with a spear butt therein.

References Cited in the file of this patent

UNITED STATES PATENTS

| | | |
|---|---|---|
| 707,000 | Pease | Aug. 12, 1902 |
| 2,267,065 | Wilen | Dec. 23, 1941 |
| 2,644,271 | Shapiro | July 7, 1953 |
| 2,745,204 | Meyers | May 15, 1956 |
| 2,796,691 | Norris | Jan. 25, 1957 |
| 2,806,317 | Minisini | Sept. 17, 1957 |

FOREIGN PATENTS

| | | |
|---|---|---|
| 920,602 | France | Apr. 14, 1947 |
| 1,003,249 | France | Mar. 17, 1952 |